United States Patent [19]

Mukai et al.

[11] Patent Number: 4,689,269
[45] Date of Patent: Aug. 25, 1987

[54] MAGNETIC RECORDING MEDIUM COMPRISING A SPECIFIC TYPE OF COPOLYMER BINDER

[75] Inventors: Yasuo Mukai, Yokohama; Yosuke Takasawa, Yamato; Masanobu Shimizu, Ebina; Shunya Shinohara, Sagamihara, all of Japan

[73] Assignee: Victor Company of Japan, Ltd., Japan

[21] Appl. No.: 722,663

[22] Filed: Apr. 12, 1985

[30] Foreign Application Priority Data

| Apr. 14, 1984 | [JP] | Japan | 59-73913 |
| Apr. 14, 1984 | [JP] | Japan | 59-73911 |
| Apr. 14, 1984 | [JP] | Japan | 59-73912 |
| Apr. 14, 1984 | [JP] | Japan | 59-73914 |
| Apr. 14, 1984 | [JP] | Japan | 59-73915 |

[51] Int. Cl.$^4$ .............................................. G11B 5/702
[52] U.S. Cl. .................... 428/413; 252/62.54; 427/128; 428/416; 428/522; 428/523; 428/524; 428/694; 428/900
[58] Field of Search ............... 428/694, 329, 695, 900, 428/522, 413, 524, 523, 416; 427/131, 128; 252/62.54; 360/134–136

[56] References Cited

U.S. PATENT DOCUMENTS

| 3,795,539 | 3/1974 | Dimino | 252/62.54 |
| 4,465,737 | 8/1984 | Miyatuka | 428/402 |
| 4,476,035 | 10/1984 | Miyoshi | 428/694 |
| 4,492,734 | 1/1985 | Ogawa | 428/900 |
| 4,559,265 | 12/1985 | Kubota | 252/62.54 |

FOREIGN PATENT DOCUMENTS

| 3200970 | 7/1983 | Fed. Rep. of Germany . |
| 59-24434 | 2/1984 | Japan . |

*Primary Examiner*—Ellis P. Robinson
*Attorney, Agent, or Firm*—Lowe, Price, LeBlanc, Becker & Shur

[57] ABSTRACT

A magnetic recording medium comprising a non-magnetic support, and a magnetic recording layer formed on the support. The layer is made of a composition which comprises magnetic powder dispersed in a resin binder comprising a thermosetting resin and a copolymer of maleic anhydride and an olefinically unsaturated monomer. The monomer is selected from alkyl esters of acrylic and methacrylic acids, alkenes, vinyl chloride, styrene and mixtures thereof.

14 Claims, No Drawings

MAGNETIC RECORDING MEDIUM COMPRISING A SPECIFIC TYPE OF COPOLYMER BINDER

BACKGROUND OF THE INVENTION

1. Field of the Invention

This invention relates to magnetic recording mediums such as magnetic tapes, floppy disks, hard disks and allied articles and more particularly, to magnetic recording mediums particularly suitable for use in magnetic disk apparatus such as computers.

2. Description of the Prior Art

Magnetic recording mediums which are used in information recording and reproducing apparatus such as, for example, magnetic disk apparatus, are of the type obtained by applying a magnetic paint of magnetic powder, dispersed in a solvent dissolving suitable resin binders, onto a non-magnetic substrate, and baking and curing the applied paint.

As information recording and reproducing apparatus are now becoming high in performance, there is an increasing demand for magnetic recording mediums of higher density. In order to meet the demand, there have been proposed a number of magnetic recording mediums including, for example, a medium whose magnetic recording layer has a smaller thickness than was used for ordinary purposes, a medium having a magnetic recording layer which is made of a completely uniform dispersion of magnetic powder, and magnetic recording mediums using magnetic powders having high coercive force, such as magnetic Co-modified gamma-$Fe_2O_3$ powder, magnetic $Cr_2O_3$ powder, and magnetic metallic powders.

When the magnetic recording layer is made thin, the amount of magnetic powder is also reduced. It is important not to reduce the amount of magnetic powder, but to reduce the amount of other ingredients such as, for example, a binder. If, however, the amount of a binder is reduced, necessary properties of the magnetic recording medium, e.g. durability, will be sacrificed.

On the other hand, magnetic powders with high coercive force are usually available as small-size particles and have a large acicular ratio, so that they have a large specific surface area. This is disadvantageous in that such powders are less likely to disperse than conventional gamma-$Fe_2O_3$ powder. It undesirably takes a longer time before the magnetic powders are dispersed to obtain uniform magnetic paints. The long dispersion operation results in a lowering of coercive force due to the breakage of the magnetic powder.

SUMMARY OF THE INVENTION

It is an object of the invention to provide a magnetic recording medium which makes use of a specific type of copolymer resin as part of a binder for dispersing magnetic powder therein whereby any magnetic powders are well dispersed in a magnetic paint without kneading for a long time.

It is another object of the invention to provide a high density magnetic recording medium comprising a magnetic recording layer which has good mechanical strength even when the layer is made thin.

It is a further object of the invention to provide a high density magnetic recording medium which ensures good magnetic characteristics because of the good dispersion of magnetic powder.

The present invention is characterized in that there is used, as a binder of a magnetic recording layer, a copolymer of maleic anhydride and an olefinically unsaturated monomer copolymerizable with maleic anhydride in combination with a thermosetting resin. The copolymer permits good dispersion of any type of magnetic powder in a resin binder.

DETAILED DESCRIPTION AND EMBODIMENTS OF THE INVENTION

The copolymers useful in the present invention are produced from maleic anhydride and olefinically unsaturated monomers by any known procedures. The olefinically unsaturated monomers include alkenes having from 2 to 18 carbon atoms, preferably 2 to 8 carbon atoms, e.g. ethylene, propylene, butene, pentene, hexene, heptene, octene and the like; alkyl esters of acrylic and/or methacrylic acid in which the alkyl moiety has from 1 to 18, preferably from 1 to 8 carbon atoms, e.g. methyl, ethyl, propyl, butyl, pentyl, hexyl, heptyl, octyl, nonyl, decyl, and the like; and vinyl chloride and styrene. These olefinically unsaturated monomers may be used singly or in combination, e.g. acrylates may be used singly or in combination thereof or with methacrylates, alkenes, styrene and/or vinyl chloride.

In view of compatibility with other resins, the copolymers have generally a molecular weight of from about 500 to 50,000, preferably from about 1000 to 10,000. The content of maleic anhydride in the copolymer is in the range of from about 5 to 80 mole%, preferably from 20 to 50 mole%. Within the above range, dispersability of magnetic powder in a resin binder comprising the copolymer is significantly improved.

In view of surface characteristics of a magnetic recording medium using a binder of the copolymer mentioned above, the copolymer should be used in combination with thermosetting resins ordinarily used for these purposes. The resins used in combination are thermosetting resins having functional groups which are able to undergo a condensation reaction with the reactive group of the maleic anhydride units in the copolymer. The functional groups may be a glycidyl group in epoxy resins, methylol and/or hydroxyl groups in phenolic, urea, polybutyral resins and the like. Specific and preferable examples of the thermosetting resins include epoxy resins, phenolic resins, melamine resins, urea resins, acrylic resins, butyral resins, and mixtures thereof. Of these, the copolymer is preferably used in combination with epoxy resins and more preferably, with mixtures of epoxy resins and phenolic resins, epoxy resins and melamine resins, epoxy resins and acrylic resins, and epoxy resins, phenolic resins and acrylic resins or polyvinyl butyral. Such mixtures should be predominantly made of epoxy resins. In practice, the copolymer is used in an amount of from 1 to 50 wt%, preferably from 5 to 20 wt%, of the total binder.

The binder comprising the maleic anhydride copolymer is used in an amount of from 30 to 200 parts by weight, preferably from 50 to 120 parts by weight, per 100 parts of magnetic powder.

The magnetic powders used in the present invention may be any magnetic metal powders ordinarily used in this art and include, for example, ferromagnetic iron oxides such as gamma-$Fe_2O_3$ and $Fe_3O_4$ with or without being deposited with Co, Ni, Mn and the like, ferromagnetic metals such as Co, Ni, Fe and alloys thereof such as Fe—Co, Fe—Ni, Co—Ni, Fe—Co—Ni, and other ferromagnetic materials such as $CrO_2$, barium ferrite and the like.

Even though these magnetic powders have a very small size, they are readily dispersed in the binder resin comprising the maleic anhydride-based copolymer. The size of the powder is generally in the range of from 0.05 to 2 μm.

For the manufacture of a magnetic recording medium, a magnetic powder is dispersed in a resin binder comprising the copolymer discussed before and a solvent for the binder by the use of a suitable mixing or kneading means. The resulting magnetic paint is coated onto a non-magnetic support at least on one side thereof, and is dried and cured under conditions of a temperature of from 50° to 250° C. for a time sufficient for the curing and/or the condensation reaction between the copolymer and a thermosetting resin. The coating may be effected by any known techniques such as spin coating, air knife coating, blade coating, dip coating, various roll coatings, spray coating and the like. Because of the use of the copolymer, the dry thickness of the recording layer may be reduced even to about 0.5 μm though it is generally in the range of from 1 to 10 μm.

Non-magnetic supports may be disks, films, foils or sheets of a variety of materials including, for example, synthetic or semi-synthetic resins such as polyesters, polyolefins, cellulose derivatives and the like, metals such as aluminum, magnesium, copper and the like, glasses and ceramics.

Aside from magnetic powders, various additives may be added to the magnetic paint. Such additives include lubricants, dispersants, stabilizers, plasticizers, and the like.

Use of the copolymers of maleic anhydride and olefinically unsaturated monomers has a number of advantages.

(1) Dispersability of magnetic powder is significantly improved, and breakage of the magnetic powder during the dispersion operation is avoided to an extent, thus preventing lowerings of coercive force and squareness ratio of the resulting magnetic recording medium.

(2) Milling or kneading time for a magnetic paint can be reduced greatly: the time is reduced to half the time required for conventional magnetic paints for equivalent surface characteristics of magnetic recording medium. This leads to a great reduction of manufacturing time and cost.

(3) Not only high mechanical strength, but also good adherence, wear resistance and solvent resistance of a magnetic recording layer are obtained because of the crosslinkage of thermosetting resins with the copolymer as explained before. With magnetic disks, the wear resistance is evaluated by the number of contact-start-stop (CSS) cycles and the specification limit prescribed in TC97/SC10N228 of ISO is over 10,000. The magnetic disk obtained according to the invention has a value much larger than the limit value. The drop of magnetic powder is rarely experienced in the magnetic recording medium of the invention. In addition, the magnetic recording layer comprising the maleic anhydride-base copolymer is very resistant to solvents such as alcohols which are used for washing of the magnetic disk on the surface thereof, and is very durable.

The present invention is more particularly described by way of examples, in which parts are by weight.

EXAMPLE 1

One hundred parts of Co-deposited gamma-$Fe_2O_3$ magnetic powder, 10 parts of alpha-$Al_2O_3$ powder, 45 parts of an epoxy resin (Epikote 1007, by Shell Petrochem. Inc.), 20 parts of a phenolic resin (Sumirac PC-25, Sumitomo Bakelite Co., Ltd.), 10 parts of butyl acrylate/maleic anhydride alternating copolymer having a value by mole of butyl acrylate/maleic anhydride of 50/50 and a weight average molecular weight of about 5000, and 620 parts of a mixed solvent of toluene and ethylene glycol monobutyl ether were placed in a ball mill and kneaded for 24 hours to obtain a magnetic paint.

The magnetic paint was applied onto an aluminum alloy substrate, followed baking and curing at 200° C. for 1 hour and polishing as usual to obtain a magnetic disk.

EXAMPLE 2

The general procedure of Example 1 was repeated using a kneading time of 12 hours, thereby obtaining a magnetic disk.

EXAMPLE 3

One hundred parts of Co-deposited gamma-$Fe_2O_3$ magnetic powder, 10 parts of alpha-$Al_2O_3$ powder, 35 parts of an epoxy resin (Epikote 1001, by Shell Petrochem. Inc.), 25 parts of an acrylic resin (Dyanal SE-5437, by Mitsubishi Rayon Co., Ltd.), 15 parts of ethyl acrylate/maleic anhydride random copolymer, in which maleic anhydride molecules are not directly bonded to each other and which has a value by mole of ethyl acrylate/maleic anhydride of 60/40 and a weight average molecular weight of about 2000, and 620 parts of a mixed solvent of toluene and ethylene glycol monobutyl ether were used to make a magnetic disc in the same manner as in Example 1.

Comparative Example

One hundred parts of Co-deposited gamma-$Fe_2O_3$, 10 parts of alpha-$Al_2O_3$, 50 parts of Epikote 1007, 25 parts of Sumirac PC-25, and 620 parts of a mixed solvent of toluene and ethylene glycol monobutyl ether were used to make a magnetic disc in the same manner as in Example 1.

The magnetic disks obtained in Examples 1 through 3 and Comparative Example were subjected to measurement of magnetic characteristics, i.e. coercive force and squareness ratio, surface defects, and were resistance. The results are shown in Table 1.

TABLE 1

| | Coercive Force (Oe) | Squareness Ratio | Surface Defects | Wear Resistance (CSS Cycles) |
|---|---|---|---|---|
| Example | | | | |
| 1 | 680 | 0.86 | 0 | >30000 |
| 2 | 685 | 0.88 | 2 | >30000 |
| 3 | 690 | 0.89 | 0 | >30000 |
| Com. Ex. | 660 | 0.80 | 8 | 18000 |

As will be apparent from the above results, the magnetic disks of the present invention have better magnetic characteristics than the comparative disk. This is considered due to good dispersability of the magnetic powder by the presence of the copolymer, by which the magnetic powder suffers less breakage at the time of kneading.

The surface defects are also much reduced and the wear resistance is so great that the medium may be used semipermanently.

Moreover, even when the kneading time is reduced to half the conventionally required time, the resulting disk is excellent as particularly seen from the results of Example 2.

EXAMPLE 4

The general procedure of Example 1 was repeated using butyl methacrylate/maleic anhydride alternating copolymer having a butyl methacrylate/maleic anhydride value by mole of 50/50 and a weight average molecular weight of about 5000, thereby obtaining a magnetic disk.

EXAMPLE 5

The general procedure of Example 4 was repeated except that the kneading time in the ball mill was reduced to half, i.e. 12 hours, thereby obtaining a magnetic disk.

EXAMPLE 6

The general procedure of Example 3 was repeated using methyl methacrylate/maleic anhydride random copolymer having a methyl methacrylate/maleic anhydride value by mole of 60/40 and a weight averge molecular weight of about 2000, thereby obtaining a magnetic disc.

EXAMPLES 7 THROUGH 9

The general procedure of Example 1 was repeated using pentene/maleic anhydride alternating copolymer having a pentene/maleic anhydride value by mole of 50/50 and a weight average molecular weight of about 5000 (Example 7), vinyl chloride/maleic anhydride alternating copolymer having a vinyl chloride/maleic anhydride value by mole of 50/50 and a weight average molecular weight of about 5000 (Example 8), and styrene/maleic anhydride alternating copolymer having styrene/maleic anhydride value by mole of 50/50 and a weight average molecular weight of about 5000, thereby obtaining magnetic disks.

EXAMPLES 10-12

The general procedure of Examples 7 through 9 was repeated except that the kneading time in the ball mill was reduced to half, i.e. 12 hours, thereby obtaining magnetic disks.

EXAMPLES 13-15

The general procedure of Example 3 was repeated using ethylene/maleic anhydride random copolymer having an ethylene/maleic anhydride value by mole of 60/40 and a weight average molecular weight of about 2000 (Example 13), vinyl chloride/maleic anhydride random copolymer having a vinyl chloride/maleic anhydride value by mole of 60/40 and a weight average molecular weight of about 2000 (Example 14), and styrene/maleic anhydride random copolymer having a sytrene/maleic anhydride value by mole of 60/40 and a weight average molecular weight of about 2000 (Example 15), thereby obtaining magnetic disks.

The magnetic disks obtained in Examples 4 through 15 were subjected to measurement in the same manner as in Examples 1 through 3. The results are shown in Table 2 below.

TABLE 2

| Example | Coercive Force (Oe) | Squareness Ratio | Surface Defects | Wear Resistance (CSS Cycles) |
|---|---|---|---|---|
| 4 | 680 | 0.86 | 0 | >30000 |
| 5 | 685 | 0.87 | 3 | >30000 |
| 6 | 690 | 0.89 | 0 | >30000 |
| 7 | 680 | 0.86 | 0 | >30000 |
| 8 | 675 | 0.87 | 0 | >30000 |
| 9 | 680 | 0.86 | 0 | >30000 |
| 10 | 690 | 0.88 | 1 | >30000 |
| 11 | 680 | 0.88 | 2 | >30000 |
| 12 | 685 | 0.86 | 3 | >30000 |
| 13 | 685 | 0.87 | 1 | >30000 |
| 14 | 680 | 0.87 | 1 | >30000 |
| 15 | 685 | 0.87 | 1 | >30000 |
| Com. Ex. | 660 | 0.80 | 8 | 18000 |

When alkyl methacrylates, alkenes, vinyl chloride and styrene are used as the olefinically unsaturated monomer, similar results are obtained as in Examples 1 through 3.

What is claimed is:

1. A magnetic recording medium comprising a nonmagnetic support, and a magnetic recording layer formed on said support and made of a composition which comprises a magnetic powder dispersed in 30 to 200 parts by weight of a cured resin binder per 100 parts by weight of said magnetic powder, said cured resin binder consisting essentially of a thermosetting resin and from 1 to 50 wt% of a copolymer of maleic anhydride and an olefinically unsaturated monomer selected from the group consisting of alkyl esters of acrylic and methacrylic acids, alkenes, vinyl chloride, styrene and mixtures thereof, said copolymer having a molecular weight of from 500 to 50,000 and a content of maleic anhydride of from 5 to 80 mole %, said thermosetting resin having functional groups which are capable of undergoing a condensation reaction with the maleic anhydride units in said copolymer.

2. A magnetic recording medium according to claim 1, wherein said olefinically unsaturated monomer is a mixture of at least two monomers selected from the group consisting of alkyl esters of acrylic and methacrylic acids, alkenes, vinyl chloride and styrene.

3. A magnetic recording medium according to claim 1, wherein said maleic anhydride content of said copolymer is from 20 to 50 mole%.

4. A magnetic recording medium according to claim 1, wherein said thermosetting resin is a resin selected from the group consisting of epoxy resins, phenolic resins, melamine resins, urea resins, acrylic resins, polyvinyl butyral resins and mixtures thereof.

5. A magnetic recording medium according to claim 4, wherein said resin is a mixture of an epoxy resin with a phenolic resin, a polyvinyl butyral resin, an acrylic resin, a melamine resin, polyvinyl butyral and phenolic resins, or acrylic and phenolic resins.

6. A magnetic recording medium according to claim 1, wherein said olefinically unsaturated monomer is styrene.

7. A magnetic recording medium according to claim 1, wherein said olefinically unsaturated monomer is an alkyl ester of acrylic acid whose alkyl moiety has from 1 to 18 carbon atoms.

8. A magnetic recording medium according to claim 7, wherein the alkyl moiety has from 1 to 8 carbon atoms.

9. A magnetic recording medium according to claim 1, wherein said olefinically unsaturated monomer is an alkyl ester of methacrylic acid whose alkyl moiety has from 1 to 18 carbon atoms.

10. A magnetic recording medium according to claim 9, wherein said alkyl moiety has from 1 to 8 carbon atoms.

11. A magnetic recording medium according to claim 1, wherein said olefinically unsaturated monomer is an alkene having from 2 to 18 carbon atoms.

12. A magnetic recording medium according to claim 11, wherein said alkene has from 2 to 8 carbon atoms.

13. A magnetic recording medium according to claim 1, wherein said olefinically unsaturated monomer is vinyl chloride.

14. A magnetic recording medium according to claim 12, wherein the amount of said copolymer included in said resin binder is from 5 to 20 wt%.

* * * * *